July 13, 1965 J. R. EVANS 3,193,910
METHOD OF MAKING BEARINGS
Original Filed April 9, 1959 2 Sheets-Sheet 1
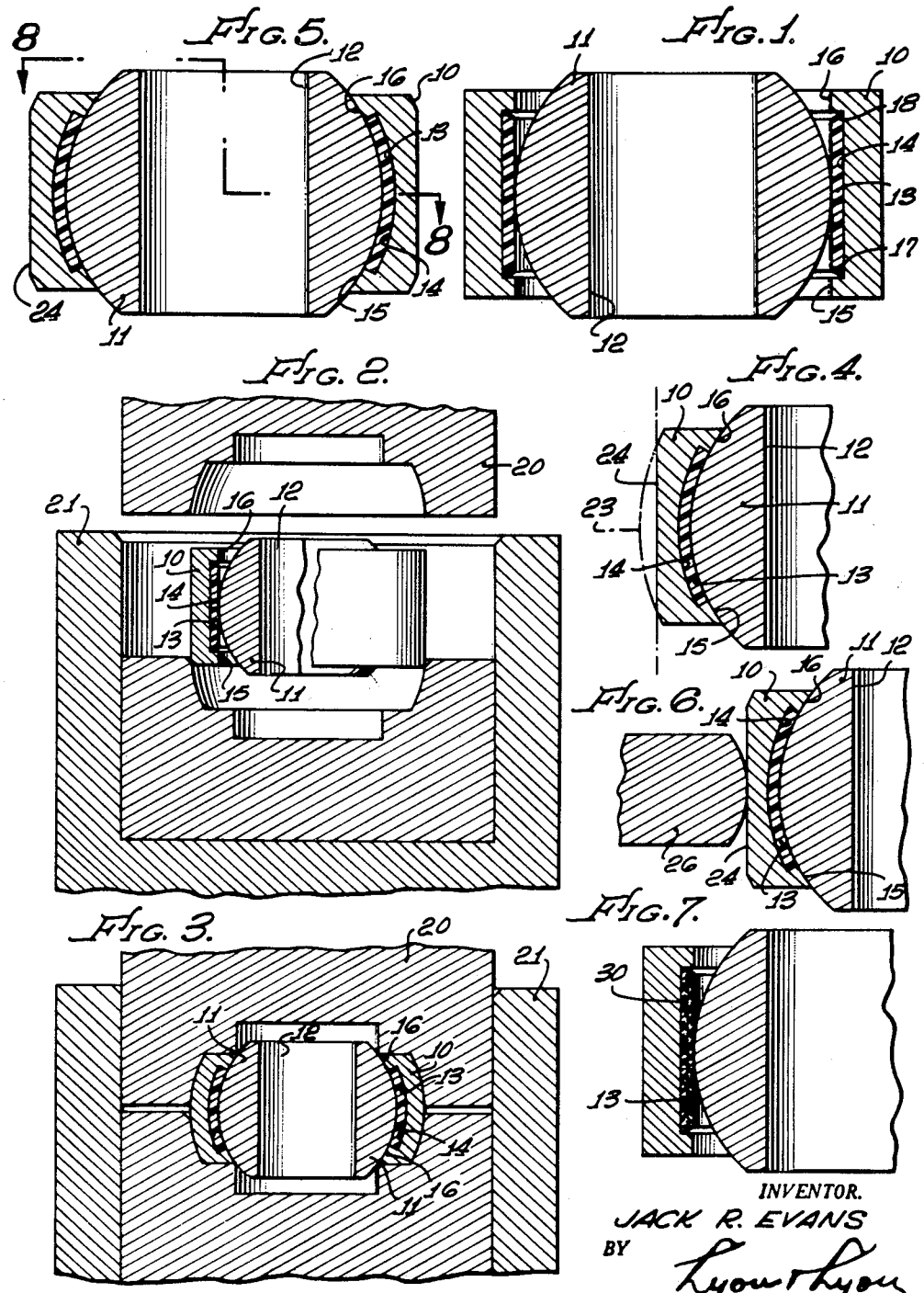
INVENTOR.
JACK R. EVANS
BY
Lyon & Lyon
ATTORNEYS.

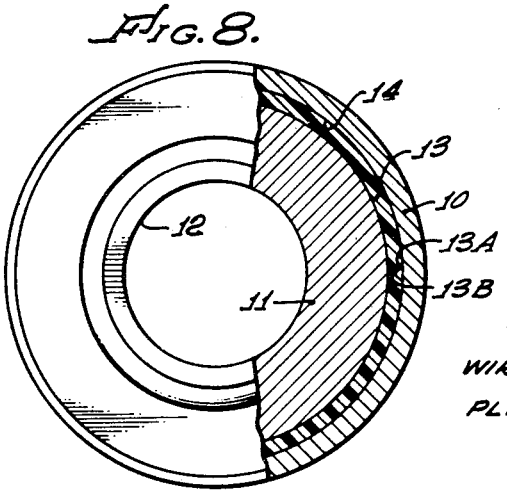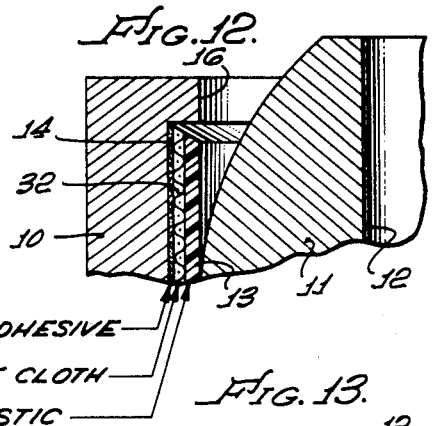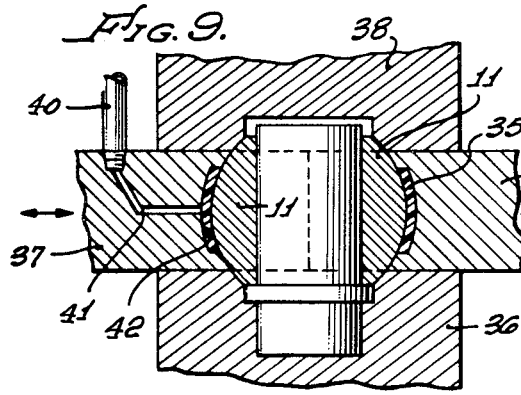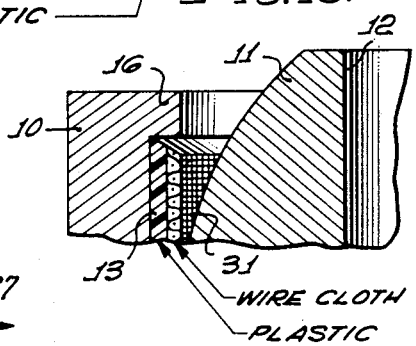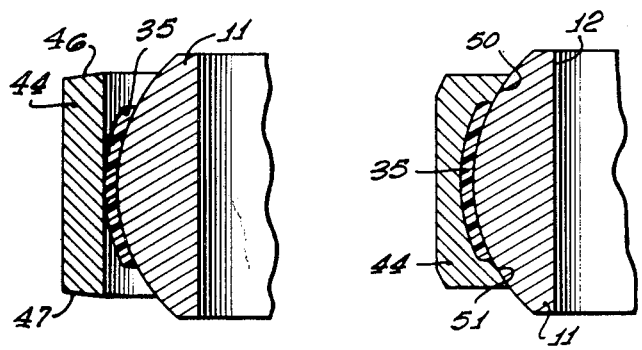

United States Patent Office 3,193,910
Patented July 13, 1965

3,193,910
METHOD OF MAKING BEARINGS
Jack R. Evans, Santa Monica, Calif., assignor to Southwest Products Co., Monrovia, Calif., a corporation of California
Application Oct. 12, 1959, Ser. No. 845,730, now Patent No. 3,085,312, dated Apr. 16, 1963, which is a division of application Ser. No. 805,295, Apr. 9, 1959. Divided and this application Oct. 1, 1962, Ser. No. 227,364
4 Claims. (Cl. 29—149.5)

The present invention relates to a method for making a bearing. The present application is a division of my copending application Serial No. 845,730 filed October 12, 1959, now U.S. Patent 3,085,312, patented April 16, 1963, which is a division of my copending application Serial No. 805,295 filed April 9, 1959, now abandoned, and assigned to the present assignee.

Bearings of the universal type, either of the so-called two-piece type or the rod-end type, which comprise a ball-shaped member rotatably maintained in a race member, have been widely used in industry. Bearings of this type are shown and described in the Potter Patents 2,626,841 and 2,728,975, each assigned to the present assignee. While these two patents refer to a two-piece bearing consisting essentially only of a ball and a race member, the present application is concerned with a method for producing a bearing in which a material having properties similar to Teflon is used as an insert.

In general, the use of inserts in prior art arrangements is necessitated largely because of the problems arising in the assembly of the ball-shaped member into the race member and the use of such inserts disposed between the ball-shaped member and the outer race member resulted in a relatively costly item and a relatively long time within which to manufacture the component parts and to assemble the same; and furthermore, the use of such inserts in prior art bearings resulted in a structure to which limited forces may be applied.

It is therefore an object of the present invention to provide an improved method for making a two-piece rod-end bearing structure of the type mentioned above characterized by the fact that the assembly uses an insert which has good anti-friction characteristics and which is retained in a novel manner so as to provide a structure to which large forces may be applied without failure of the bearing assembly.

The features of the present invention which are believed to be novel are set forth with particularly in the appended claims. This invention itself, both as to its organization and manner of operation, together with further objects and advantages thereof, may be best understood by reference to the following description taken in connection with the accompanying drawings in which:

FIGURES 1–6 illustrate progressive steps used in the present method embodying features of the present invention and specifically FIGURE 1 illustrates the assembly prior to forming of the race around the ball; FIGURE 2 illustrates the assembly shown in FIGURE 1 disposed within a die structure; FIGURE 3 illustrates the die structure in its closed position; FIGURE 4 is an enlarged sectional view illustrating the bearing after the forming operation shown in FIGURE 3 and also indicates the metal of the race member which is machined to provide the bearing illustrated in FIGURE 5; FIGURE 5 is an enlarged sectional view showing the finished bearing; FIGURE 6 illustrates one manner in which the bearing assembly may be toleranced.

FIGURE 7 is a view similar to FIGURE 1 and shows a modified insert in a bearing which is formed in the manner illustrated in FIGURES 1–6.

FIGURE 8 is a view taken generally along the lines 8—8 of FIGURE 5.

FIGURES 9–11 illustrate steps in another method embodying features of the present invention, FIGURE 9 showing the manner in which the insert is injected in a die structure, FIGURE 10 illustrating the race member disposed around the preformed plastic material previously placed around the ball as in FIGURE 9, and FIGURE 11 showing the shape of the race member after it is formed.

FIGURES 12 and 13 illustrate other modified arrangements.

Referring to FIGURES 1–6, the finished bearing comprises an outer race member 10, a preformed ball 11 having a bore 12 extending therethrough and an insert 13 of self-lubricating qualities such as those exhibited by Teflon. The outer race member 10 is illustrated in its original form in FIGURE 1 and consists essentially of an annular cylindrical ring in which there is a preformed inner grooved portion 14 for accommodating the insert material 13. In other words, the race 10 has its inner diameter grooved to provide a central channel 14 which is defined by a pair of squared annular shoulders 15 and 16. The depth of the groove 14 is established by the particular size of the bearing which is being made. In a typical ½" bearing, i.e. one in which the diameter of bore 12 is ½", the depth of the groove 14 may be .030" and the shoulders or edges 15 and 16, which may also be termed lands, may be approximately .015" to .020" wide. The lining or insert material 13 is placed in this groove 14 so as to snugly fit in the groove, the same being originally generally rectangular in cross section and prepared from flat stock material in the form of a strip having its edges beveled as illustrated at 13A and 13B in FIGURE 8 so as to increase the contact area between adjacent ends of such strip when the same is assembled as in FIGURE 1, the ends of the strip 13 then comprising a lap joint. The radial thickness of the material in FIGURE 1 is substantially equal to the depth of the groove 14.

It should also be carefully noted in FIGURE 1 that the edges 17 and 18 of the annular strip 13 are beveled for purposes which will be made clear in further description of the process. The assembly shown in FIGURE 1 is placed in a pair of forming dies 20 and 21 and it is noted that there is sufficient frictional forces developed between the ball 11 and the material 13 to maintain the ball 11 in a centered position with respect to the outer race member 10.

FIGURE 3 illustrates the dies 20 and 21 in their fully closed positions. During relative movement of the dies 20 and 21 between their positions shown in FIGURES 2 and 3, the outer race member 10 containing the material 13 within groove 14 is formed around the ball 11 which in this instance also serves as a part of the die assembly. During such forming operation it is noted that the originally squared ends or lands 15 and 16 are pressed radially inwardly to cooperate with the originally beveled edges 17 and 18 of material 13 to form a dovetail construction which assures retention of the liner or insert 13 during its subsequent use. This forming operation may be termed a coining operation in that the outer race member 10 with the insert 13 therein is pressed into direct and intimate contact with the ball 11 which, as mentioned previously, also acts as a die member.

After the forming operation illustrated in FIGURES 2 and 3, the ball 11 may be "frozen" within the outer race member assembly 10, 13 or there may exist a heavy frictional drag between the ball 11 and the race assembly 10, 13. In some cases the pressure applied between the die members 20 and 21 may be just sufficient to form a completed bearing in which there is the required clearance between the ball and the race assembly 10, 13 so that subsequent loosening or "tolerancing" is not required, but this entails a critical adjustment of die-forming pressures and it is preferred that the pressures applied between the dies 20 and 21 be sufficient so that the bearing, after the forming operation, requires some "tolerancing" or loosening. This is particularly desirable when it is desired to obtain a bearing in which the clearance between the ball and race assembly is adjusted to a predetermined magnitude from a condition of "zero" clearance, i.e. a frozen condition.

The term "tolerancing" as used herein has reference to subsequent operations after the die forming operation for establishing a predetermined clearance between the ball and race assembly.

Such "tolerancing" may be accomplished in one of two different ways. The first method of tolerancing uses the means and techniques described in the above-mentioned Potter Patent 2,724,172 and the same is illustrated in FIGURE 6 herein. Prior to such tolerancing, it may be desired to first machine the outer surface of the race member 10, as indicated in FIGURE 4, to cut off the crowned portion 23 indicated in dotted lines to produce the flat or cylindrical portion 24. In other cases it may be desired to tolerance the bearing before machining with the machining being accomplished after the bearing has been toleranced. Referring to FIGURE 6, tolerancing may be achieved by rolling the outer race member 10 between a plurality of pressure rollers, one of which is illustrated at 26 and in the manner illustrated in the above-mentioned Potter Patent 2,724,172.

Alternatively, other means may be used for applying radially inwardly directed tolerancing forces to the outer race member 10, for example the outer race member 10 may be subjected, while it is on a firm support, to a series of hammer blows applied equally along the circumference of the outer race member 10. Such application of mechanical forces either by subjecting the race member 10 to pressure rollers or to hammer blows serves to relieve stresses in the outer race member 10 so as to provide the desired clearance or tolerance between the race assembly and the ball.

It is noted that during the forming operations illustrated in FIGURES 2 and 3 the outer race member 10 has a predetermined and substantially a uniformly developed stress pattern therein in which, in general, the inner portion of the race member 10 is under compression and the outer portion is under tension. This stress pattern is used to advantage in subsequent tolerancing as described above. This particular method of tolerancing is used to advantage, particularly when the lands 15 and 16 are pressed into direct and intimate contact with the ball and remain such after the die forming operation.

Other tolerancing methods may involve subjecting the assembly, after it leaves the dies, to heat as, for example, by placing the assembly in a baking oven of a predetermined temperature for a predetermined time sufficient to cure and/or stress-relieve the liner 13. It is noted that this liner 13, after the forming operation, is also placed in a stressed condition and it is considered that the temperature in the baking oven relieves the stresses in the liner material. It is noted that after the forming operation the liner 13 snugly engages the ball and, as mentioned previously, the lands 15 and 16 may also preferably engage the ball so that in some cases it may be desirable to tolerance the assembly using both mechanical forces as illustrated in connection with FIGURE 6 and by subjecting the assembly to a temperature in an oven during a sufficiently long period of time to cure the liner material. In those cases where the lands 15 and 16 do not remain in direct and intimate contact with the ball 11 after the forming operation, it may not be necessary to apply mechanical forces but tolerancing may be accomplished exclusively by application of heat. In other cases it may be desirable to provide the desired tolerancing by application of mechanical forces alone.

The liner 13 is preferably of a thermosetting plastic material so that during the baking process, when used, the same becomes harder, i.e. the material polymerizes so that it is more serviceable and will withstand higher loadings in use thereof. In some cases the material forming the liner may be cured without subjecting it to temperature. In other words, it may be cured chemically by adding a catalyst or other suitable chemical or reagent to the material. In some cases the material may be of the type which shrinks while it polymerizes and in shrinking it provides the desired tolerance.

It is considered that Teflon is a thermoplastic material which is not thermosetting and if pure Teflon were used, the same would flow out between the lands 15 and 16 and the ball before the outer race member is completely closed during the die forming operation. For that reason pure Teflon is considered unsuitable, this being so since Teflon is considered a thermoplastic material and is cold flowing. It is thus considered necessary to provide some means to limit cold flowing of Teflon if it is used. For this purpose the material comprising liner 13 is a combination of a thermoplastic material and a thermosetting material, each of which may be originally in the form of a flock. The thermoplastic material exhibits low friction characteristics similar to that of Teflon.

Further, in some cases the forming operation could be carried out using heated dies 20 and 21 in which case the forming and curing operations are carried out while the bearing assembly is within the dies.

Further, as illustrated in connection with FIGURES 7, 12 and 13, the material comprising the liner 13 may be reinforced using a stainless steel wire cloth. The reinforcing material 30, as illustrated in FIGURE 7, may be embedded in the plastic material by, for example, a rolling process, so that the reinforcing material 30 is embedded in the material and does not touch the ball, there being at least a separation of approximately .055" between the ball and the reinforcing material. In some cases the wire cloth 31 may be placed between the liner material 13 and the ball 11, as illustrated in FIGURE 13, so that during the die forming operation the wire cloth 31 is pressed within the material 13 and in such case portions of the wire cloth may touch the ball 11.

As illustrated in FIGURE 12, the wire cloth 32 may originally be cemented or bonded in the channel 14 by well known bonding process involving an epoxy cement so that during the subsequent die forming operations illustrated in FIGURES 2 and 3 the stainless steel wire cloth 32 becomes embedded in the linear material 13. This latter expedient is particularly desirable in the case of larger size bearings, i.e. bearings of a ¾" size or larger. In the case of light duty small bearings, the reinforcing material may be omitted but the same is desirable when small bearings are required for heavy duty work.

As illustrated in FIGURES 9–11, the liner material 35 comprising a combination of thermosetting and thermoplastic materials, as mentioned above, is formed around the ball 11 using injection molding dies 36, 37 and 38. With these dies positioned as shown, the material in a plastic state is injected through the pipe or tube 40 and through channel 41 into the die cavity 42 wherein the material 35 is molded around the ball 11. After this molding operation illustrated in FIGURE 9, the race member 44 is formed around the ball and liner material 35 using forming dies as illustrated in FIGURES 2 and 3. In this case the outer race member 44 need not be pregrooved but may have a generally rectangular cross section, as illustrated in FIGURE 10, with tapered portions 46 and 47 so that after the forming operation the race member 44 takes the shape illustrated in FIGURE 11. In this case the retaining lands 50 and 51, which retain the material 35 during subsequent use of the bearing, are formed during the die forming operation. The material 35 may be loosened from the ball 11 as well as the lands 50 and 51 using any one of the expedients described above, i.e. by the use of temperature, by the use of mechanical forces or by combination of temperature and chemical forces.

The material 35 is a combination of a thermosetting and a thermoplastic material, the thermoplastic material being Teflon or a material having self-lubricating properties similar to Teflon.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A method of making a bearing having a ball, an outer race member and an annular insert of thermoplastic and thermosetting material between said ball and race member, the steps comprising forming an annular cylindrical race member, molding said insert around said ball with the insert being centrally positioned and contacting most of the circumferential area of the ball, and forming the entire outer and inner surfaces of said race member around said ball and insert to form a pair of spaced annular shouldered portions on the race member to extend around and engage opposite edges of the insert and retain said insert in said race member.

2. The method set forth in claim 1, in which said shouldered portions are formed to contact the ball.

3. The method as set forth in claim 2, in which said race member is formed around said ball and said insert by heated die members.

4. The method as set forth in claim 1, in which said insert is molded around said ball using injection molding dies disposed around the ball and defining a peripheral space around the ball which is filled with said insert material.

References Cited by the Examiner

UNITED STATES PATENTS

| Re. 18,843 | 5/33 | Skillman | 308—72 |
| 2,350,398 | 6/44 | Hufferd | 287—85 |
| 2,476,728 | 7/49 | Heim | 29—149.5 |
| 2,804,886 | 9/57 | White | 139—420 |
| 2,835,521 | 5/58 | White | 287—90 |
| 2,857,656 | 10/58 | Straub | 29—149.5 |
| 2,958,927 | 11/60 | Kravats | 29—149.5 |
| 2,966,459 | 12/60 | Abel | 29—149.5 |
| 2,979,353 | 4/61 | Sellers | 287—85 |
| 3,068,552 | 12/62 | Williams et al. | 308—238 |

WHITMORE A. WILTZ, *Primary Examiner.*

THOMAS H. EAGER, *Examiner.*